(12) United States Patent
Ooe et al.

(10) Patent No.: US 7,692,921 B2
(45) Date of Patent: Apr. 6, 2010

(54) ELECTRONIC DEVICE

(75) Inventors: Toshio Ooe, Ome (JP); Yuji Nakajima, Nishitama-gun (JP); Noriyasu Kawamura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 694 days.

(21) Appl. No.: 11/411,763

(22) Filed: Apr. 26, 2006

(65) Prior Publication Data

US 2006/0245151 A1 Nov. 2, 2006

(30) Foreign Application Priority Data

Apr. 28, 2005 (JP) .............................. 2005-132077

(51) Int. Cl.
*G06F 1/16* (2006.01)
(52) U.S. Cl. ....................... 361/683; 206/714; 439/607; 174/374
(58) Field of Classification Search ................... 174/50, 174/63, 374; 439/55, 188, 607; 206/711, 206/714; 165/80.3; 312/223.2; 361/679–687, 361/724–727; 29/830
See application file for complete search history.

(56) References Cited

U.S. PATENT DOCUMENTS 6,708,400 B2 * 3/2004 Kintis et al. .................. 29/830

2002/0048148 A1 4/2002 Horiuchi et al.
2004/0240166 A1 * 12/2004 Kuo ........................... 361/683
2006/0067061 A1 * 3/2006 Shimada et al. ............. 361/726
2008/0019085 A1 * 1/2008 Nakajima .................... 361/680

FOREIGN PATENT DOCUMENTS

JP 04-280518 10/1992
JP 2000-232271 8/2000

* cited by examiner

*Primary Examiner*—Hung V Duong
(74) *Attorney, Agent, or Firm*—Blakely, Sokoloff, Taylor & Zafman LLP

(57) ABSTRACT

An electronic device includes a housing and a circuit board contained in the housing. The housing includes a main wall, a side wall, a vertical wall, a first rib, and a second rib. The side wall is integrally formed with the main wall. The vertical wall is integrally formed with the main wall and faces to the side wall. The first rib is integrally formed with the side wall and the main wall. The first rib extends from the side wall toward the vertical wall. The first rib has a first end portion separated from the vertical wall. The second rib is integrally formed with the vertical wall and the main wall. The second rib extends from the vertical wall toward the side wall. The second rib has a second end portion separated from the side wall. The second rib faces to the first end.

17 Claims, 13 Drawing Sheets

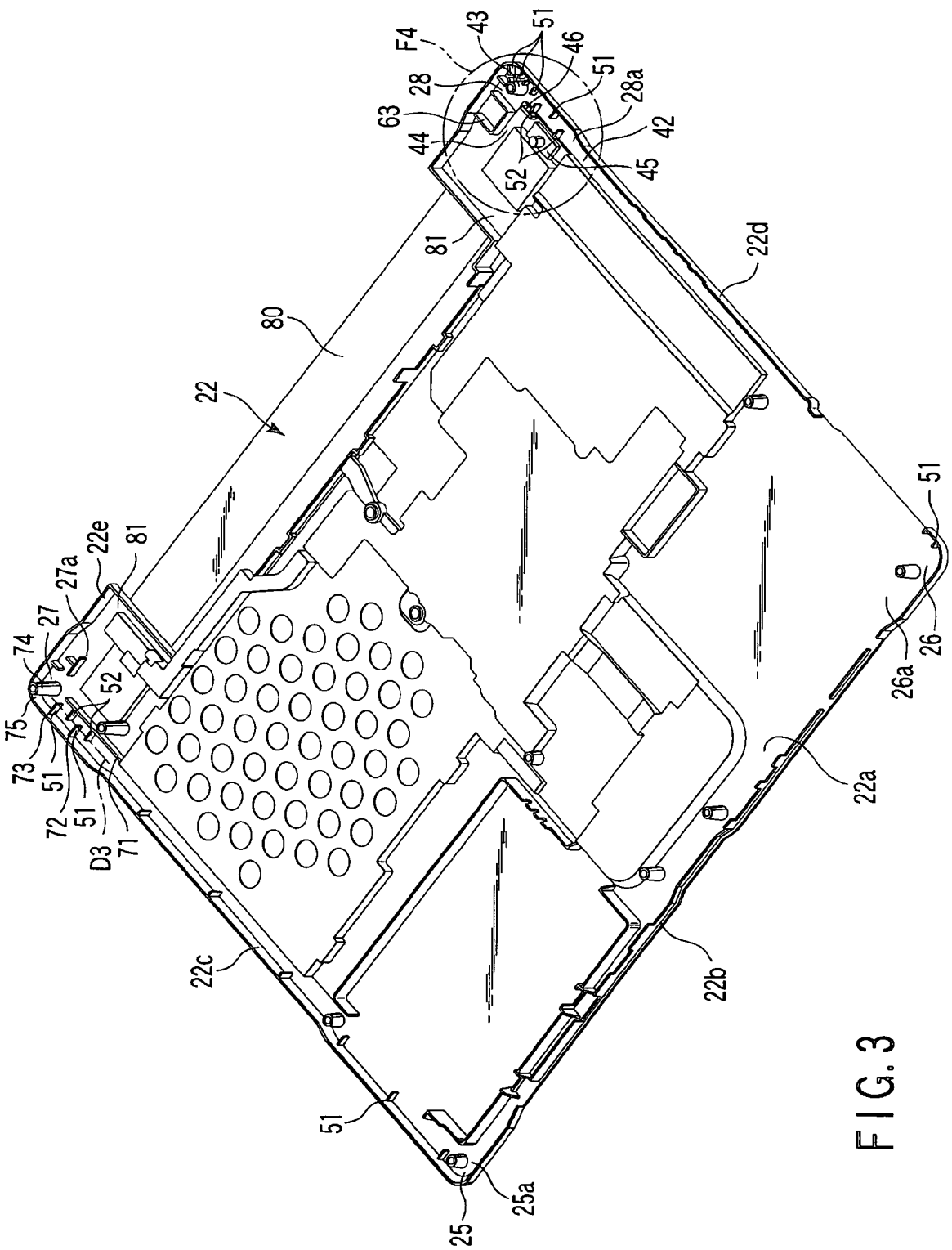
F I G. 3

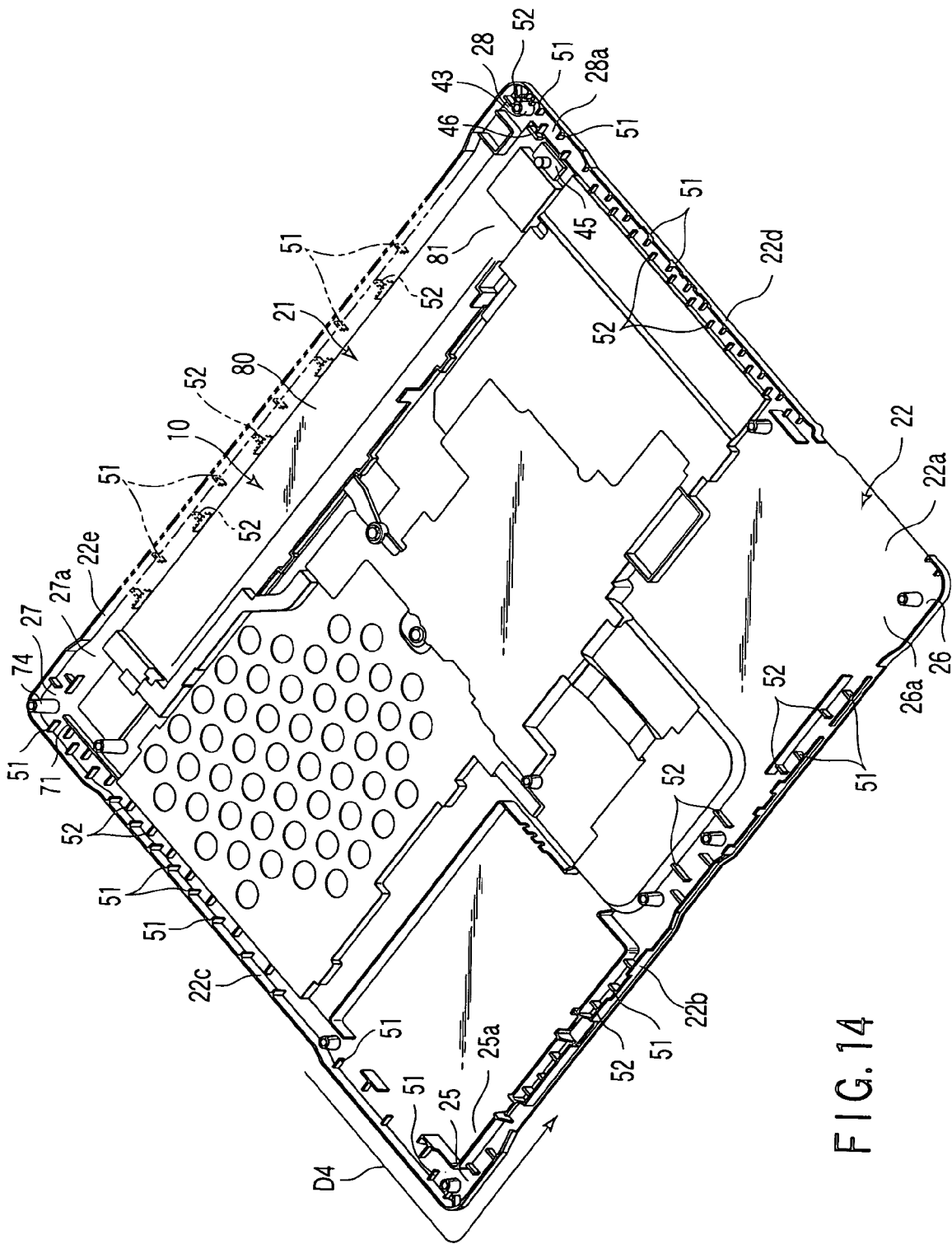
F I G. 14

US 7,692,921 B2

ELECTRONIC DEVICE

CROSS-REFERENCE TO RELATED APPLICATIONS

This application is based upon and claims the benefit of priority from Japanese Patent Application No. 2005-132077, filed Apr. 28, 2005, the entire contents of which are incorporated herein by reference.

BACKGROUND

1. Field

The present invention relates to an electronic device including a housing provided with a reinforcing structure.

2. Description of the Related Art

A housing for an electronic device such as a portable computer is reinforced to enhance strength.

As one example of a reinforcing structure, there is a structure in which a plurality of ribs are formed on a peripheral wall of the housing. The ribs extend inwards from the peripheral wall. The plurality of ribs are formed on a part or the substantially whole of the peripheral wall. The strength of the housing is enhanced by the structure including the ribs.

On the other hand, when an impact is exerted on the housing, it is cracked by the impact. When a crack is formed in this manner, the housing absorbs the impact. The absorption of the impact inhibits the transmission of the impact to a PCB (printed circuit board) and the like stored in the housing.

However, in a case where the housing has such a reinforcing structure as described above, it is considered that when the high impact is exerted, the crack is formed in a broad region to connect tips of the ribs while avoiding the ribs. When the crack is formed in the broad region, the housing unfavorably looks bad.

Therefore, there is proposed a reinforcing structure in which the ribs extend from a region of the peripheral wall to be provided with the ribs to a vertical wall facing the region and formed in the housing, thereby further enhancing the strength of the housing. This type of reinforcing structure is disclosed in Jpn. Pat. Appln. KOKAI Publication No. 4-280518. The further enhancement of the strength of the housing inhibits the formation of the crack in the housing.

However, in the reinforcing structure disclosed in Jpn. Pat. Appln. KOKAI Publication No. 4-280518, the further enhancement of the strength of the housing difficulty in absorbing the exerted by the peripheral wall. Therefore, when the high impact is exerted on the peripheral wall, it is considered that the high impact is transmitted to a component such as a PCB without being absorbed by the housing.

When the impact is transmitted to a component such as the PCB in this manner, a function of the component is liable to be destroyed. Therefore, it is not preferable that the impact is transmitted to a component such as the PCB without being absorbed by the housing.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is a perspective view showing the inside of an upper cover shown in FIG. 2;

FIG. 14 is a perspective view showing the inside of an upper cover of a portable computer in a seventh embodiment of the present invention.

DETAILED DESCRIPTION

Various embodiments according to the invention will be described hereinafter with reference to the accompanying drawings. In general, according to one embodiment of the invention, an electronic device includes a housing and a circuit board contained in the housing. The housing includes a main wall, a side wall, a vertical wall, a first rib, and a second rib. The side wall is integrally formed with the main wall. The vertical wall is integrally formed with the main wall. The vertical wall faces to the side wall. The first rib is integrally formed with the side wall and the main wall and extends from the side wall toward the vertical wall. The first rib has a first end portion separated from the vertical wall. The second rib is integrally formed with the vertical wall and the main wall and extends from the vertical wall toward the side wall. The second rib has a second end portion separated from the side wall. The second rib faces to the first end portion.

As one example of an electronic device in a first embodiment of the present invention, a portable computer 10 will be described with reference to FIGS. 1 to 7.

Figure 1:
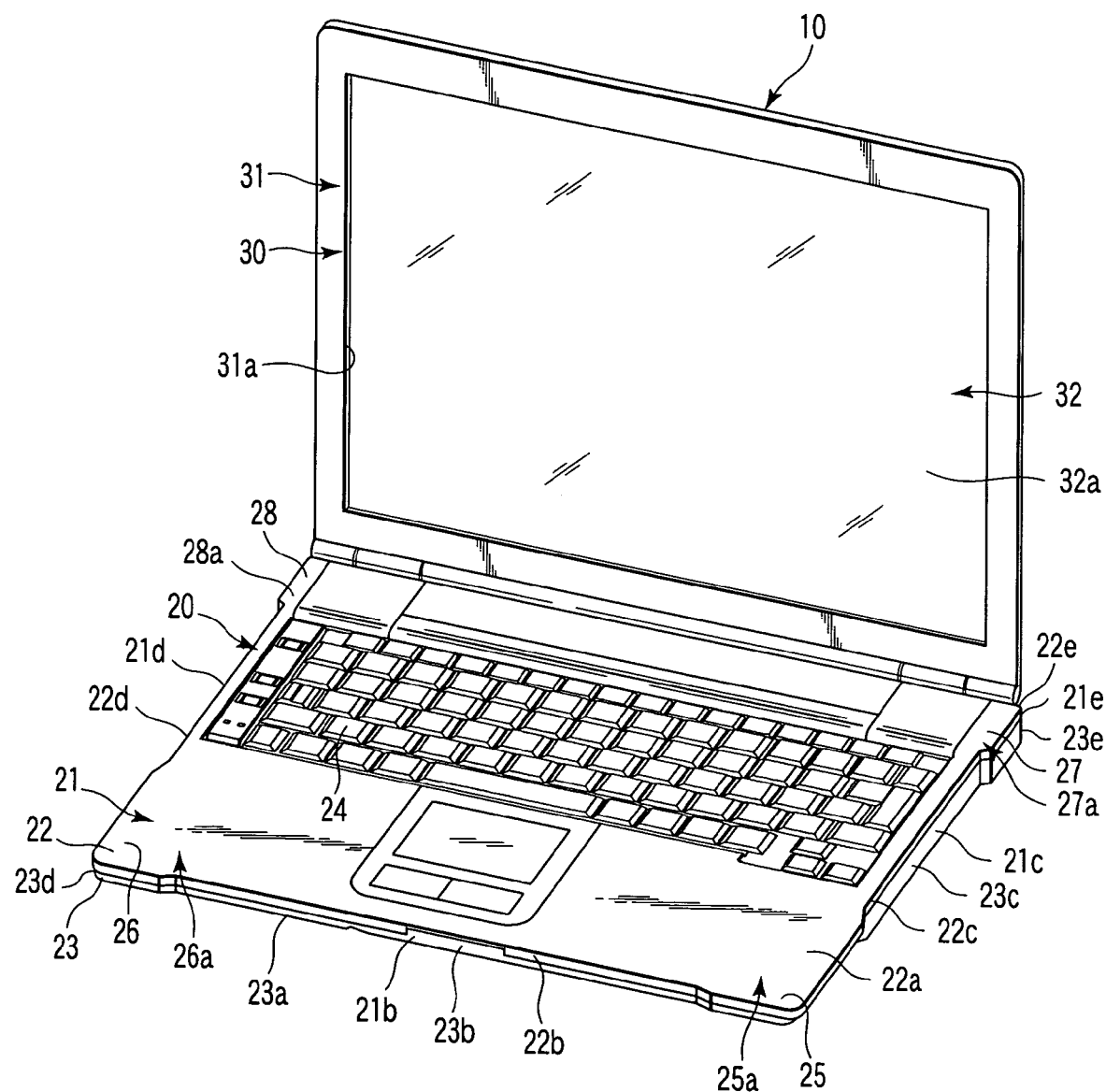
FIG. 1 is a perspective view of a portable computer in a first embodiment of the present invention.

FIG. 1 shows the portable computer 10. As shown in FIG. 1, the portable computer 10 includes a computer main body 20 and a display unit 30.

The computer main body 20 includes a first housing 21 and a circuit board 300. The first housing 21 is one example of a housing which is referred to in the present invention. The first housing 21 has a flat box shape. Components such as a hard disk are contained in the first housing 21.

Figure 2:
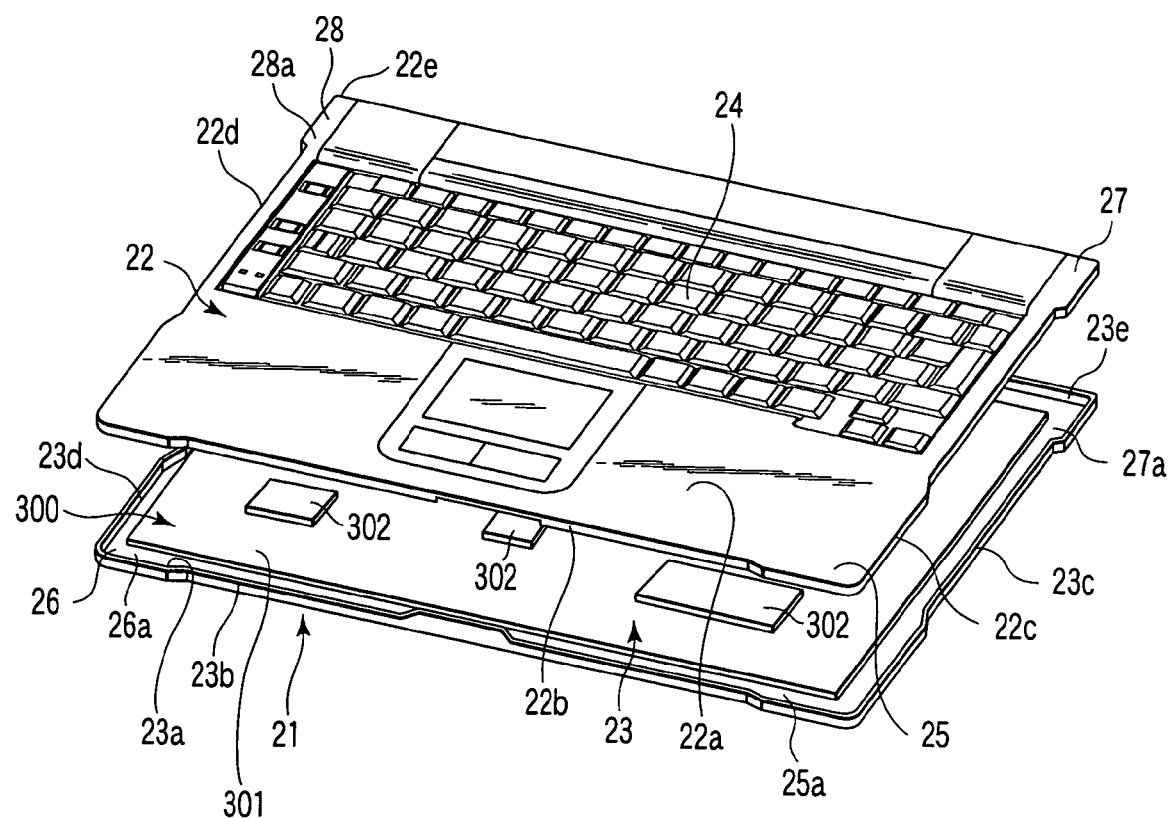
FIG. 2 is an exploded perspective view of a first housing shown in FIG. 1.

FIG. 2 shows an exploded state of the first housing 21. As shown in FIG. 2, the first housing 21 includes an upper cover 22 and a lower cover 23. The upper cover 22 constitutes an upper part of the first housing 21. The lower cover 23 constitutes a lower part of the first housing 21. The first housing 21 is formed by superimposing the upper cover 22 and the lower cover 23 on each other.

The upper cover 22 opens downwards. The upper cover 22 is formed of, for example, a magnesium alloy. Note that the material forming the upper cover 22 is not limited to the magnesium alloy. For example, the upper cover 22 may be formed of another metal. The upper cover 22 may be formed of a resin.

The upper cover 22 has an upper wall 22a, an upper front wall 22b, an upper left wall 22c, an upper right wall 22d, and an upper rear wall 22e. The upper wall 22a is one example of a main wall mentioned in the present invention. A keyboard 24 is disposed on the upper surface of the upper wall 22a.

The upper front wall 22b is integrally formed on a front edge of the upper wall 22a, and extends downwards. The upper left wall 22c is integrally formed on a left edge of the upper wall 22a, and extends downwards. The upper right wall 22d is integrally formed on a right edge of the upper wall 22a, and extends downwards. The upper rear wall 22e is integrally formed on a rear edge of the upper wall 22a, and extends downwards. Each of the upper front wall 22b, the upper left wall 22c, the upper right wall 22d, and the upper rear wall 22e is one example of the side wall mentioned in the present invention.

A structure of the upper cover 22 will be described later in detail.

The lower cover 23 opens upwards. The lower cover 23 has a lower wall 23a, a lower front wall 23b, a lower left wall 23c, a left right wall 23d, and a lower rear wall 23e. The lower wall 23a is one example of an main wall mentioned in the present invention.

The lower front wall 23b is integrally formed on a front edge of the lower wall 23a, and extends upwards. The lower left wall 23c is integrally formed on a left edge of the lower wall 23a, and extends upwards. The lower right wall 23d is integrally formed on a right edge of the lower wall 23a, and extends upwards. The lower rear wall 23e is integrally formed on a rear edge of the lower wall 23a, and extends upwards.

Each of the lower front wall 23b, the lower left wall 23c, the lower right wall 23d, and the lower rear wall 23e is one example of the side wall mentioned in the present invention.

As shown in FIG. 1, the upper front wall 22b is superimposed on the lower front wall 23b in a vertical direction to form a front wall 21b of the first housing 21. The upper left wall 22c is superimposed on the lower left wall 23c in the vertical direction to form a left wall 21c of the first housing 21. The upper right wall 22d is superimposed on the lower right wall 23d in the vertical direction to form a rightwall 21d of the first housing 21. The upper rear wall 22e is superimposed on the lower rear wall 23e in the vertical direction to form a rear wall 21e of the first housing 21.

As shown in FIG. 2, The circuit board 300 includes a substrate 301 and some circuit components 302. The some circuit components 302 are mounted on the substrate 301. The circuit board 300 is contained in the first housing 21.

As shown in FIGS. 1 and 2, portions in the vicinity of a left front corner portion 25 of the first housing 21, specifically the portions on the sides of the left wall 21c and the front wall 21b via the corner portion 25 extend outwards to form a protruding portion 25a.

Portions in the vicinity of a right front corner portion 26, specifically the portions on the sides of the right wall 21d and the front wall 21b via the corner portion 26 extend outwards to form a protruding portion 26a. Portions in the vicinity of a left rear corner portion 27, specifically the portions on the sides of the left wall 21c and the rear wall 21e via the corner portion 27 extend outwards to form a protruding portion 27a. Portions in the vicinity of a right rear corner portion 28, specifically the portions on the sides of the right wall 21d and the rear wall 21e via the corner portion 28 extend outwards to form a protruding portion 28a.

These protruding portions 25a, 26a, 27a, and 28a extend outwardly from portions other than the protruding portions 25a, 26a, 27a, and 28a in the first housing 21.

Therefore, the upper cover 22 and the lower cover 23 in the vicinity of four corners extend outwardly, which correspond to the respective protruding portions 25a, 26a, 27a, and 28a.

As shown in FIG. 1, the display unit 30 is provided with a second housing 31 and a liquid crystal display panel 32. The liquid crystal display panel 32 is stored in the second housing 31. The liquid crystal display panel 32 has a screen 32a to display an image. The screen 32a is exposed outwardly from the second housing 31 through an opening 31a formed in the front surface of the second housing 31.

The second housing 31 is supported on a rear end portion of the first housing 21 via a hinge (not shown). The display unit 30 is rotatable between a closed position and an opened position. In the closed position, the display unit 30 is laid on the computer main body 20 to cover the keyboard 24 from above. In the opened position, the display unit 30 stands with respect to the computer main body 20 to expose the keyboard 24 and the screen 32a.

The first housing 21 is provided with a reinforcing structure against an impact at a time when, for example, the portable computer 10 falls. This reinforcing structure for the upper cover 22 will be described representatively.

FIG. 3 shows the inside of the upper cover 22. As shown in FIG. 3, in the upper cover 22, the protruding portion 27a in the vicinity of the left rear corner portion 27, and the protruding portion 28a in the vicinity of the right rear corner portion 28 are provided with the reinforcing structure.

Figure 4:
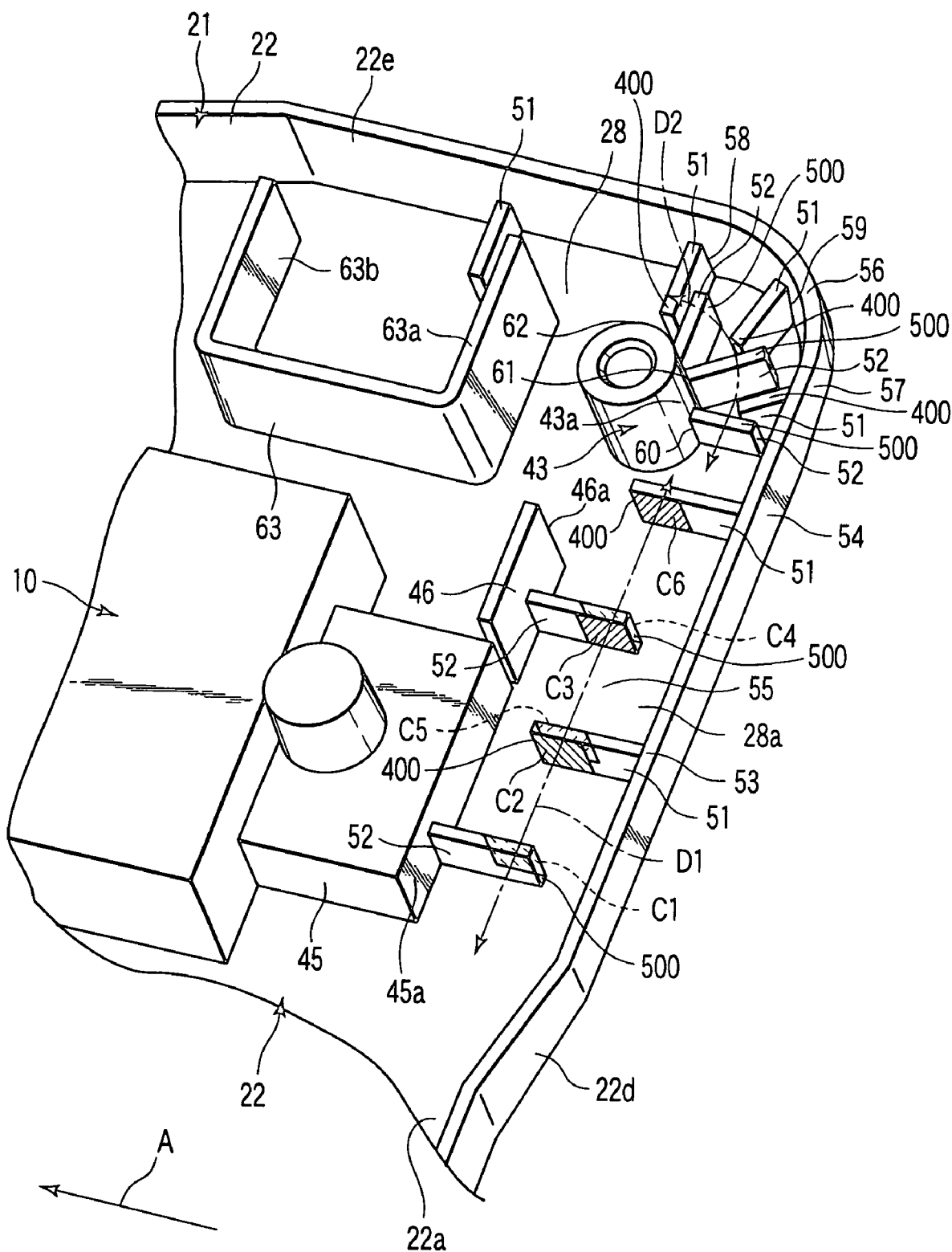
FIG. 4 is a perspective view showing an enlarged region of F4 shown in FIG. 3.

FIG. 4 enlarges and shows a region of F4 shown in FIG. 3. As shown in FIG. 4, a boss portion 43 is formed in the corner portion 28 of the upper cover 22. The boss portion 43 passes, for example, a bolt therethrough to fasten the upper cover 22 and the lower cover 23 to each other in a case where they are assembled.

The boss portion 43 extends downwards from the inner surface of the upper wall 22a. Note that FIG. 4 shows that the inside of the upper cover 22 opens upwards. Therefore, it is shown that the boss portion 43 extends upwards. The boss portion 43 has a substantially columnar shape.

Moreover, an inner portion of the upper cover 22 facing the upper right wall 22d in the region of the protruding portion 28a is provided with a protrusion 45 for use in arranging various components such as the PCB in the first housing 21. The protrusion 45 is integrally formed with the upper wall 22a. A vertical wall 46 facing the upper right wall 22d is formed between the protrusion 45 and the boss portion 43. The vertical wall 46 is integrally formed with the upper wall 22a.

A wall surface 45a of the protrusion 45 facing the upper right wall 22d and a wall surface 46a of the vertical wall 46 facing the upper right wall 22d are positioned, for example, on substantially the same plane.

As the reinforcing structure, the protruding portion 28a is provided with a plurality of first ribs 51 and a plurality of second ribs 52.

Among the plurality of first ribs 51, two first ribs 51 are formed in an inner region of the protruding portion 28a in the upper right wall 22d. One of the first ribs 51 formed in the upper right wall 22d is formed in a first point 53 facing the protrusion 45 in the upper right wall 22d.

The other first rib 51 is formed in a second point 54 between the boss portion 43 and the vertical wall 46 in the upper right wall 22d. The first point 53 is positioned in front of the second point 54.

The first ribs 51 formed in the first and second points 53 and 54 extend inwardly along a direction A from the upper right wall 22d toward the upper left wall 22c, and are substantially parallel to each other.

Figure 5:
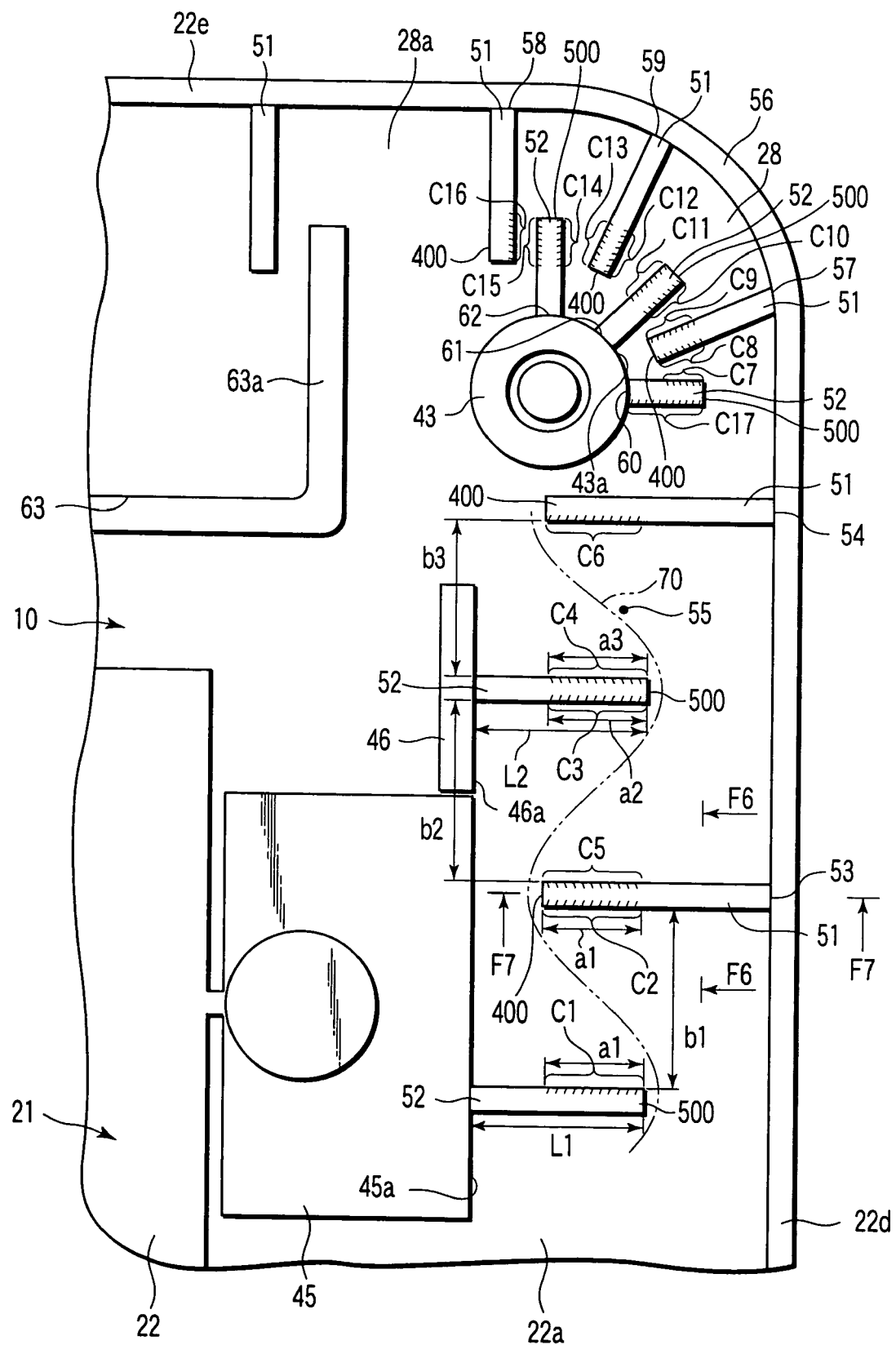
FIG. 5 is a plan view of the region of F4 shown in FIG. 3.

FIG. 5 is a plan view of the region of F4 shown in FIG. 3. As shown in FIG. 5, the first ribs 51 formed in the first and second points 53 and 54 of the upper right wall 22d extend from an intermediate point 55 toward the protrusion 45 and the vertical wall 46, between the protrusion 45 and vertical wall 46 and the upper right wall 22d.

Tips of the first ribs 51, or a first end portion 400, formed in the first and second points 53 and 54 do not reach the protrusion 45 and the vertical wall 46. A length of each of the first ribs 51 formed in the first and second points 53 and 54 is one example. That is, the first end portion 400 is separated from the protrusion 45 and the vertical wall 46. The first ribs 51 do not reach the vertical wall such as the protrusion 45 or the vertical wall 46.

The lengths of the first ribs 51 formed in the first and second points 53 and 54 are determined depending on a strength required for the protruding portion 28a. Rigidity of the region in the vicinity of the first rib 51 in the upper right wall 22d enhances, when each first rib 51 lengthens.

An impact input from the side of the upper right wall 22d deforms or destroys, for example, the upper wall 22a, and is accordingly absorbed. The first ribs 51 formed in the first and second points 53 and 54 are provided with predetermined lengths to secure the strength of the first housing 21. Moreover, the first ribs 51 do not reach the protrusion 45 or the vertical wall 46. Deformation and destruction described above takes place between the first ribs 51 on the one hand, and the protrusion 45 and vertical wall 46, on the other hand. That is, openings between the first member 51 and the protrusion 45, or, between the first member 51 and the vertical wall 46 function as a deformation or destruction tolerance.

Figure 6:
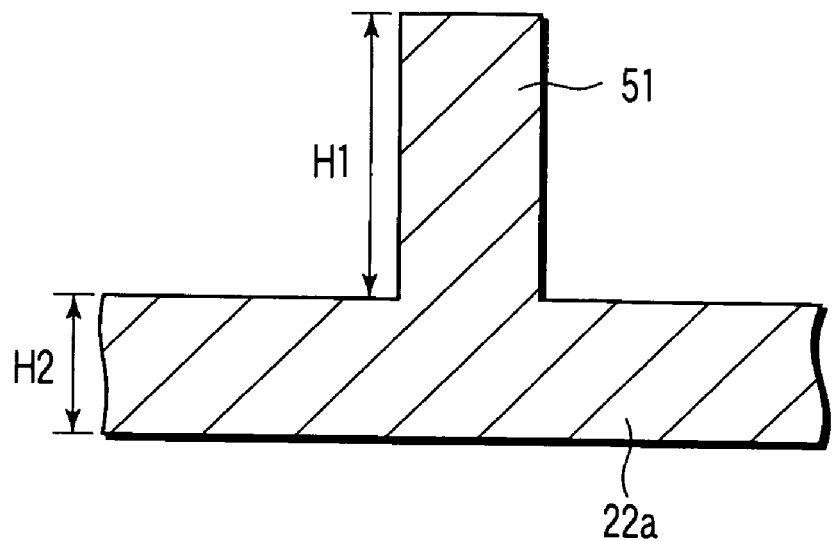
FIG. 6 is a sectional view cut along line the F6-F6 shown in FIG. 5.

FIG. 6 is a sectional view cut along line F6-F6 shown in FIG. 5. As shown in FIG. 6, a height H1 of the first rib 51 formed in the first point 53 is larger than a thickness H2 of the upper wall 22a in the vicinity of the first point 53. That is, H1>H2.

Similarly, the height of the first rib 51 formed in the second point 54 is set to be larger than the thickness of the upper wall 22a in the vicinity of the second point 54.

Figure 7:
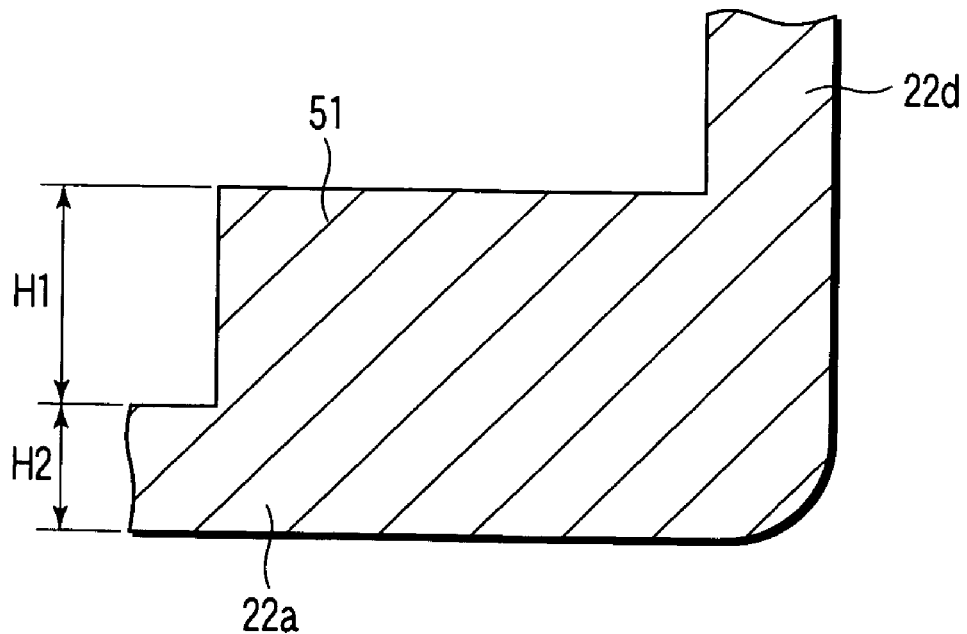
FIG. 7 is a sectional view cut along the line F7-F7 shown in FIG. 5.

FIG. 7 is a sectional view cut along line F7-F7 shown in FIG. 5. As shown in FIG. 7, a side surface shape of the first rib 51 formed in the first point 53 of the upper right wall 22d is, for example, a substantially rectangular shape. Therefore, the height H1 of the first rib 51 formed in the first point 53 is larger than H2 in the whole region.

The side surface shape of the first rib 51 formed in the second point 54 is substantially similar to that of the first rib 51 formed in the first point 53. Therefore, the height of the first rib 51 formed in the second point 54 is larger than the thickness of the upper wall 22a in the vicinity of the point where the first rib 51 is formed in the whole region.

Note that the side surface shapes of these first ribs 51 are not limited to the substantially rectangular shapes. For example, the side surface shape of the first rib 51 may be trapezoidal. In this case, the height of the lowest portion of the first rib 51 may be larger than the thickness of the upper wall 22a in the vicinity of the point provided with the first rib 51.

As shown in FIGS. 6 and 7, the first ribs 51 formed in the first and second points 53 and 54 are formed integrally with the upper wall 22a and the upper right wall 22d.

As shown in FIG. 4, among the plurality of second ribs 52, one of second rib 52 is formed integrally with the protrusion 45 and the upper wall 22a. Therefore, the protrusion 45 functions as a vertical wall mentioned in the present invention. As described above, the existing protrusion 45 or the like may be utilized as the vertical wall.

The second rib 52 formed on the protrusion 45 extends from the wall surface 45a facing the upper right wall 22d toward the upper right wall 22d. The second rib 52 formed on the protrusion 45 is disposed in front of the first rib 51 formed in the first point 53.

The second rib 52 formed on the protrusion 45 extends substantially in parallel with the first ribs 51 formed in the first and second points 53 and 54 toward the upper right wall 22d.

The second rib 52 formed on the protrusion 45 is formed integrally with the protrusion 45 and the upper wall 22a like the first ribs 51 formed in the first and second points 53 and 54.

The height of the second rib 52 formed on the protrusion 45 is larger than the thickness of the upper wall 22a in the vicinity of the point where the second rib 52 is formed in the same manner as in the first ribs 51 formed in the first and second points 53 and 54.

Among the plurality of second ribs 52, another second rib 52 is formed integrally with the vertical wall 46 and the upper wall 22a. As shown in FIGS. 4 and 5, the second rib 52 extends from the wall surface 46a facing the upper right wall 22d toward the upper right wall 22d in the vertical wall 46.

The second rib 52 formed on the vertical wall 46 is disposed between the first ribs 51 formed in the first and second points 53 and 54, and extends substantially in parallel with the first ribs 51 formed in the first and second points 53 and 54. The vertical wall 46 is one example of the vertical wall mentioned in the present invention.

The second rib 52 formed on the vertical wall 46 is formed integrally with the vertical wall 46 and the upper wall 22a in the same manner as in the first ribs 51 formed in the first and second points 53 and 54.

The height of the second rib 52 formed on the vertical wall 46 is larger than the thickness of the upper wall 22a in the vicinity of the second rib 52.

The side surface shapes of the second ribs 52 formed on the protrusion 45 and the vertical wall 46 are, for example, substantially rectangular shapes in the same manner as in the first ribs 51 formed in the first and second points 53 and 54. Moreover, the heights of these second ribs 52 are larger than the thickness of the upper wall 22a in the vicinity of the second ribs 52 in the substantially whole region. The side surface shape of the second rib 52 is not limited to the substantially rectangular shape in the same manner as in the first ribs 51 formed in the first and second points 53 and 54.

The first ribs 51 formed in the first and second points 53 and 54, the second rib 52 formed on the protrusion 45, and the second rib 52 formed on the vertical wall 46 are disposed, for example, apart from one another at an substantially equal interval along a direction D1 in which these ribs are arranged. The arrangement direction D1 is substantially linear.

Tips of the second ribs 52, or a second end portion 500, formed in the protrusion 45 and the vertical wall 46 do not reach the upper right wall 22d. A length of each of the second ribs 52 formed in the protrusion 45 and the vertical wall 46 is one example. That is, the second end portion 500 is separated from the upper right wall. The second ribs 52 do not reach the side wall such as the upper right wall 23d.

An impact input from the side of the upper right wall 22d deforms or destroys, for example, the upper wall 23a, and is accordingly absorbed. The second ribs 52 formed in the protrusion 45 and the vertical wall 46 are provided with predetermined lengths to secure the strength of the first housing 21. Moreover, the second ribs 52 do not reach the upper right wall 22d. Deformation and destruction described above takes place between the second ribs 52 on the one hand, and the upper right wall 22d, on the other hand. That is, openings between the second ribs 52 and the upper right wall 22d function as a deformation or destruction tolerance.

There will be specifically described an arrangement relation among the first ribs 51 formed in the first and second points 53 and 54, the second rib 52 formed on the protrusion 45, and the second rib 52 formed on the vertical wall 46. A distance from the first rib 51 formed in the second point 54 to the second rib 52 formed on the vertical wall 46, a distance from the second rib 52 formed on the vertical wall 46 to the first rib 51 formed in the first point 53, and a distance from the first rib 51 formed in the first point 53 to the second rib 52 formed on the protrusion 45 are substantially equal intervals.

The length of the second rib 52 formed on the protrusion 45 is set to have an area C1 of the second rib 52 facing the first rib 51 formed in the first point 53 along the arrangement direction D1.

The area C1 of the side surface of the second rib 52 formed on the protrusion 45 facing the first rib 51 formed in the first point 53 is shown by slant lines. An area C2 of the first rib 51 formed in the first point 53 facing the second rib 52 formed on the protrusion 45 is shown by slant lines.

As shown in FIG. 5, the facing areas C1 and C2 are determined depending on the distance from the first rib 51 formed in the first point 53 to the second rib 52 formed on the protrusion 45. This respect will be specifically described.

As shown in FIG. 5, assuming that the distance from the first rib 51 formed in the first point 53 to the second rib 52 formed on the protrusion 45 is b1, and the length of each of the facing areas C1 and C2 is a1, a length L1 of the second rib 52 formed on the protrusion 45 is determined to satisfy a1>b1/2.

A length L2 of the second rib 52 formed on the vertical wall 46 is set to have areas C3 and C4 facing the first ribs 51 formed in the first and second points 53 and 54, respectively. In FIG. 4, the areas C3 and C4 of the second rib 52 formed on the vertical wall 46 facing the first ribs 51 in the first and second points 53 and 54 are shown by slant lines.

As shown in FIG. 5, the facing area C3 is determined depending on the distance from the first rib 51 formed in the first point 53 to the second rib 52 formed on the vertical wall 46. This respect will be described specifically.

Assuming that the distance from the first rib 51 formed in the first point 53 to the second rib 52 formed on the vertical wall 46 is b2, and the length of the facing area is a2, a length L2 of the second rib 52 formed on the vertical wall 46 is determined to satisfy a2>b2/2.

Note that the first rib 51 formed in the first point 53 has an area C5 similar to the area C3. Similarly, the first rib 51 formed in the second point 54 has an area C6 similar to the facing area C4.

Furthermore, assuming that the length of the facing area C4 of the second rib 52 formed on the vertical wall 46 is a3, and the distance from the first rib 51 formed in the second point 54 to the second rib 52 formed on the vertical wall 46 is b3, a length L2 of the second rib 52 formed on the vertical wall 46 is determined to satisfy a3>b3/2.

That is, the length L2 of the second rib 52 formed on the vertical wall 46 is determined to satisfy a2>b2/2 and a3>b3/2.

Note that in the present embodiment, the first ribs 51 formed in the first and second points 53 and 54, the second rib 52 formed on the vertical wall 46, and the second rib 52 formed on the protrusion 45 are arranged apart from one another at an equal interval. That is, b1=b2=b3.

Moreover, in the present embodiment, the lengths of the first ribs 51 formed in the first and second points 53 and 54 are, for example, equal to each other. The length of the second rib 52 formed on the protrusion 45 is, for example, equal to that of the second rib 52 formed on the vertical wall 46.

Therefore, in the present embodiment, when the length L2 of the second rib 52 is determined to satisfy a2>b2/2, the length a3 of the facing area C4 satisfies a3>b3/2.

Next, with reference to FIGS. 4 and 5, there will be described first and second ribs 51, 52 formed in the corner portion 28 and the upper rear wall 22e among a plurality of first and second ribs 51, 52.

The upper right wall 22d is gently bonded to the upper rear wall 22e in the corner portion 28. A shape of a connection portion 56 which connects the upper right wall 22d to the upper rear wall 22e is, for example, substantially circular.

Three first ribs 51 are formed on the connection portion 56 which connects the upper right wall 22d to the upper rear wall 22e in the corner portion 28. These three first ribs 51 are formed in a third point 57 positioned in front of the connection portion 56, a fourth point 58 positioned rearward, and a fifth point 59 positioned between the third point 57 and the fourth point 58, respectively.

These three points 57, 58, and 59 are disposed, for example, apart from one another at a substantially equal interval. Therefore, the respective first ribs 51 formed in the three points 57, 58, and 59 are disposed apart at the substantially equal interval. The first ribs 51 formed in these three points 57, 58, and 59 extend inwardly in the corner portion 28. Since the boss portion 43 is formed substantially in the center of the corner portion 28, three first ribs 51 formed in the connection portion 56 extend toward the boss portion 43.

These three first ribs 51 are formed integrally with the connection portion 56 and the upper cover 22 in the same manner as in the first ribs 51 formed in the first and second points 53 and 54. The height of each of these three first ribs 51 is set to be larger than the thickness of the upper wall 22a in the vicinity of the point where each rib is formed. The side surface shapes of these three first ribs 51 are substantially rectangular in the same manner as in the first ribs 51 formed in the first and second points 53 and 54.

Three second ribs 52 are formed on the boss portion 43. Three second ribs 52 formed on the boss portion 43 are formed on a facing surface portion 43a facing the connection portion 56 in a peripheral surface of the boss portion 43. Therefore, the boss portion 43 functions as the vertical wall mentioned in the present invention.

As shown in FIG. 5, the three second ribs 52 formed on the boss portion 43 are formed in a sixth point 60, a seventh point 61, and an eighth point 62 of the facing surface portion 43a, respectively.

The sixth point 60 lies in front of the third point 57. The seventh point 61 faces a point between the third point 57 and the fifth point 59. The eighth point 62 faces a point between the fifth point 59 and the fourth point 58. The sixth point 60, the eighth point 62, and the seventh point 61 are almost equidistantly apart.

The three second rib 52 formed on the boss portion 43 are formed integrally with the boss portion 43 and the upper wall 22a. The side surface shapes of three second ribs 52 formed on the boss portion 43 are substantially rectangular in the same manner as in the first ribs 51 formed in, for example, the first and second points 53 and 54. The heights of three second ribs 52 formed on the boss portion 43 are set to be larger than the thicknesses of the upper wall 22a in the vicinity of the points where the respective ribs are formed, respectively.

The second rib 52 formed in the sixth point 60 extends toward a front portion of the first rib 51 formed in the third point 57. The second rib 52 formed in the seventh point 61 extends between the first ribs 51 formed in the third and fifth points 57 and 59. The second rib 52 formed in the eighth point 62 extends toward the first ribs 51 formed in the fourth and fifth points 58 and 59.

The first and second ribs 51, 52 formed in the corner portion 28 are arranged in a substantially circular form, and are disposed apart from one another at equal intervals. As shown by a one-dot chain line in FIG. 4, a direction D2 in which the first and second ribs 51, 52 formed in the corner portion 28 are arranged is substantially circular.

As shown in FIG. 5, the lengths of the first and second ribs 51 and 52 formed in the third and sixth point 57 and 60 are set so that these first and second ribs 51, 52 have areas C7, C8 facing each other along the arrangement direction D2. The facing area C7 is disposed in the second rib 52 formed in the sixth point 60. The facing area C8 is disposed in the first rib 51 formed in the third point 57.

Moreover, the length of the second rib 52 formed in the sixth point 60 is set so that the second rib has an area C17 facing the first rib 51 formed in the second point 54.

The lengths of the first and second ribs 51 and 52 formed in the third and seventh point 57 and 61 are set so that these first and second ribs 51, 52 have areas C9, C10 facing each other along the arrangement direction D2. The facing area C9 is disposed in the first rib 51 formed in the third point 57. The facing area C10 is disposed in the second rib 52 formed in the seventh point 61.

The lengths of the second and first ribs 52 and 51 formed in the seventh and fifth point 61 and 59 are set so that these second and first ribs 52 and 51 have areas C11, C12 facing each other along the arrangement direction D2. The facing area C11 is disposed in the second rib 52 formed in the seventh point 61. The facing area C12 is disposed in the first rib 51 formed in the fifth point 59.

The lengths of the first and second ribs 51 and 52 formed in the fifth and eighth point 59 and 62 are set so that these first and second ribs 51, 52 have areas C13, C14 facing each other along the arrangement direction D2. The facing area C13 is disposed in the first rib 51 formed in the fifth point 59. The facing area C14 is disposed in the second rib 52 formed in the eighth point 62.

The lengths of the second and first ribs 52 and 51 formed in the eighth and fourth point 62 and 58 are set so that these second and first ribs 52 and 51 have areas C15, C16 facing each other along the arrangement direction D2. The facing area C15 is disposed in the second rib 52 formed in the eighth point 62. The facing area C16 is disposed in the first rib 51 formed in the fourth point 58.

The facing mentioned in the present invention is a concept including a case where the respective first and second ribs 51, 52 are not parallel to each other as in the arrangement direction D2. Therefore, even when the respective first and second ribs 51, 52 are not parallel to each other as in the first and second ribs 51, 52 formed in the corner portion 28, these first and second ribs 51, 52 have areas facing each other along the arrangement direction D2.

The first rib 51 is formed inwardly from the first rib 51 formed in the fourth point 58 along the upper rear wall 22e. This first rib 51 extends inwards. As shown in FIG. 4, a recessed portion 63 opening toward the upper rear wall 22e is formed in a region of the protruding portion 28a facing the upper rear wall 22e.

The recessed portion 63 is used, for example, in disposing components such as the PCB and the hard disk drive in the first housing 21 in the same manner as in protrusion 45.

The recessed portion 63 has two arm portions 63a, 63b extending toward the upper rear wall 22e. In the present embodiment, these two arm portions 63a and 63b are arranged, respectively, on the side of the first rib 51 formed in the upper rear wall 22e. Therefore, these two arm portions 63a, 63b have functions of second ribs mentioned in the present invention.

Next, there will be described a behavior of the first housing 21 at a time when an impact is input into the portable computer 10 with respect to the protruding portion 28a as one example.

For example, in a case where the portable computer 10 falls, when an impact having a value which is not less than a predetermined value is input from the upper right wall 22d in the region of the protruding portion 28a, a crack 70 is formed in the upper wall 22a as shown by a two-dot chain line in FIG. 5. The predetermined value is an unfavorable value for components such as the hard disk and the PCB contained in, for example, the first housing 21.

The crack 70 winds its way to avoid tips of the first ribs 51 formed in the first and second points 53 and 54, the second rib 52 formed on the protrusion 45, and the second rib 52 formed on the vertical wall 46.

For example, even in a case where the impact having a value which is not less than the predetermined value is input into the corner portion 28, the crack formed in the upper wall 22a of the corner portion 28 winds its way to avoid the first and second ribs 51, 52 formed in the corner portion 28.

Note that as shown in FIG. 3, a plurality of first ribs 51 and a plurality of second ribs 52 are formed on the protruding portion 27a in the vicinity of the corner portion 27 in the upper cover 22 in the same manner as in the protruding portion 28a.

A vertical wall 71 is formed in a position facing the upper left wall 22c in the protruding portion 27a. The vertical wall 71 is provided with two second ribs 52. These two second ribs 52 extend toward the upper left wall 22c.

Moreover, two first ribs 51 are formed in a region of the protruding portion 27a in the upper left wall 22c. One of these two first ribs 51 is formed in a ninth point 72. The first rib 51 formed in the ninth point 72 extends toward a point between two second ribs 52 formed on the vertical wall 71. The other first rib 51 is formed in a tenth point 73 behind two second ribs 52 formed on the vertical wall 71.

The lengths of the first ribs 51 formed in the ninth and tenth points are determined depending on the strength required for the protruding portion 28a in the same manner as in the lengths of the first ribs 51 formed in the first and second points 53 and 54.

The second rib 52 formed on the vertical wall 71 and the first ribs 51 formed in the ninth and tenth points 72 and 73 are arranged so that the first and second ribs 51, 52 are alternately arranged. An arrangement direction D3 of these first and second ribs 51, 52 is substantially linear.

The lengths of these first and second ribs 51, 52 are set so that the adjacent ribs have areas facing each other along the arrangement direction D3. The lengths of the areas facing the first and second ribs 51, 52 are set to be longer than halves of the lengths of the first and second ribs 51, 52 in the same manner as in the facing areas disposed in the first and second ribs 51, 52 formed in the protruding portion 28a.

Moreover, the corner portion 27 is provided with a boss portion 74 having a function similar to that of the boss portion 43. The upper left wall 22c is gently bonded to the upper rear wall 22e via a connection portion 75. Although not shown, a plurality of second ribs 52 facing the connection portion 75 may be formed in a region facing the connection portion 75 connecting the upper left wall 22c to the upper rear wall 22e in the peripheral face of the boss portion.

Furthermore, the connection portion 75 may have the first ribs 51 that are provided on either of each second rib 52 formed on the boss portion 74. A direction in which the first rib 51 formed on the connection portion 75 and the second rib 52 formed on the boss portion 74 are arranged is substantially circular as in the arrangement direction D2.

The lengths of the first rib 51 formed on the connection portion 75 and the second rib 52 formed on the boss portion 74 are set so that the first and second ribs 51, 52 disposed adjacent to each other in the arrangement direction have facing areas in a direction in which the ribs are arranged.

When the first and second ribs 51, 52 are formed in the protruding portion 27 as described above, a crack formed by the impact within the protruding portion 27a of the upper wall 22a winds its way to avoid the first and second ribs 51, 52 in the same manner as in the crack 70.

Moreover, in the upper cover 22 of the present embodiment, the first ribs 51 are formed in portions other than the protruding portions 27a, 28a in the upper left wall 22c, the upper right wall 22d, and the upper front wall 22b. These first ribs 51 extend inwards.

In the portable computer 10 formed in this manner, as shown in FIG. 5, the crack 70 formed by the impact input into the first housing 21 winds its way. The crack 70 is formed in the first housing 21 to absorb the impact. The length of the crack 70 is proportional to a size of impact.

That is, when the impact enlarges, the crack 70 lengthens. However, as described above, when the first housing 21 is provided with the reinforcing structure including the first and second ribs 51, 52, the crack 70 winds its way.

That is, even when the large impact is input to lengthen the crack 70, the crack 70 winds its way to minimize the region in which the crack 70 is formed. Therefore, the region where the crack 70 is formed is minimized even after the impact having the value which is not less than the predetermined value is input into the first housing 21, and the appearance is therefore prevented from being worsened by the crack 70.

Moreover, by forming the plurality of first and second ribs 51, 52 are formed to broaden the region in which the crack 70 winds its way is broaden.

Furthermore, the first rib 51 and the second rib 52 are arranged alternately one by one, whereby the crack 70 effectively winds.

In addition, the protruding portions 25a, 26a, 27a, and 28a are formed in the first housing 21. Therefore, if the portable computer 10 falls, the computer reaches the ground by any of the protruding portions 25a, 26a, 27a, and 28a.

Moreover, the protruding portions 27a, 28a of the upper cover 22 are provided with the reinforcing structure including the first and second ribs 51, 52, the region of the crack 70 formed by the impact input into the first housing 21 is effectively minimized. Therefore, the deterioration of the appearance of the first housing 21 is effectively inhibited.

Furthermore, the heights of the first and second ribs 51, 52 are larger than the thicknesses of the upper wall 22a in the vicinity of the points where the respective first and second ribs 51, 52 are formed. Consequently, the strengths of the first and second ribs 51, 52 themselves are secured, and the first and second ribs 51, 52 are not destroyed by the impact.

In other words, the crack 70 formed by the impact avoids the first and second ribs 51, 52, and winds its way without passing through the first and second ribs 51, 52. Therefore, the region where the crack 70 is formed is effectively narrowed.

Moreover, in a case where the first and second ribs 51, 52 are substantially linearly arranged as in the arrangement direction D1, the lengths of these first and second ribs 51, 52 are set so that the length of each of the areas facing each other is larger than a half of the distance between the areas. Specifically, $a1>b1/2$, $a2>b2/2$, and $a3>b3/2$ are satisfied.

Therefore, the length of winding crack 70 is larger than a length about 1.2 times that of the substantially linearly formed crack. Therefore, the region where the crack 70 is formed is effectively minimized.

Note that in the present embodiment, there has been described representatively the reinforcing structure including the first and second ribs 51, 52 disposed in the protruding portions 27a, 28a of the upper cover 22. However, the present invention is not limited to this embodiment. For example, the reinforcing structure including the first and second ribs 51, 52 may be formed in the protruding portions 25a, 26a.

Moreover, in the present embodiment, there has been described representatively the reinforcing structure including the first and second ribs 51, 52 disposed in the upper cover 22. However the present invention is not limited to this embodiment. For example, the reinforcing structure including the first and second ribs 51, 52 may be formed in the lower cover 23. The reinforcing structure including the first and second ribs 51, 52 may be disposed in the second housing 31.

When the reinforcing structure including the first and second ribs 51, 52 is disposed in the lower cover 23 and the second housing 31, the first rib 51 is formed inwardly from the side wall of the lower cover 23 or the second housing 31. The second rib 52 is formed on the vertical wall disposed in the portion facing the portion provided with the first rib 51 in the lower cover 23 or the second housing 31.

Note that the numbers and arrangements of the first and second ribs 51, 52 used in the protruding portions 27a, 28a are illustrative and not restrictive. Two first ribs 51 are formed within the region of the protruding portion 28a in the upper right wall 22d, and each of the protrusion 45 and the vertical wall 46 is provided with one second rib 52. However three or four first ribs 51 may be formed on the upper right wall 22d. Similarly, two or three second ribs 52 may be formed on the protrusion 45 and the vertical wall 46. Accordingly, a plurality of vertical walls may be formed and provided with the second ribs 52.

The number of the first or second ribs 51, 52 is determined depending on the strength required for, for example, the first housing 21 or the second housing 31. In short, the first and second ribs 51, 52 are arranged in order along the direction in which they are arranged, and the first and second ribs 51, 52 may only have the areas facing each other along the arrangement direction.

The above description also applies to, for example, the corner portions 25, 26, and 27, or the other protruding portions 25a, 26a, 27a, and 28a.

Next, there will be described an electronic device in a second embodiment of the present invention in accordance with a portable computer 10 as one example with reference to FIG. 8. Note that a constitution having a function similar to that of the first embodiment is denoted with the same reference numerals and description is omitted.

The present embodiment is different from the first embodiment in a length of a second rib 52. This respect will be described specifically.

Figure 8:
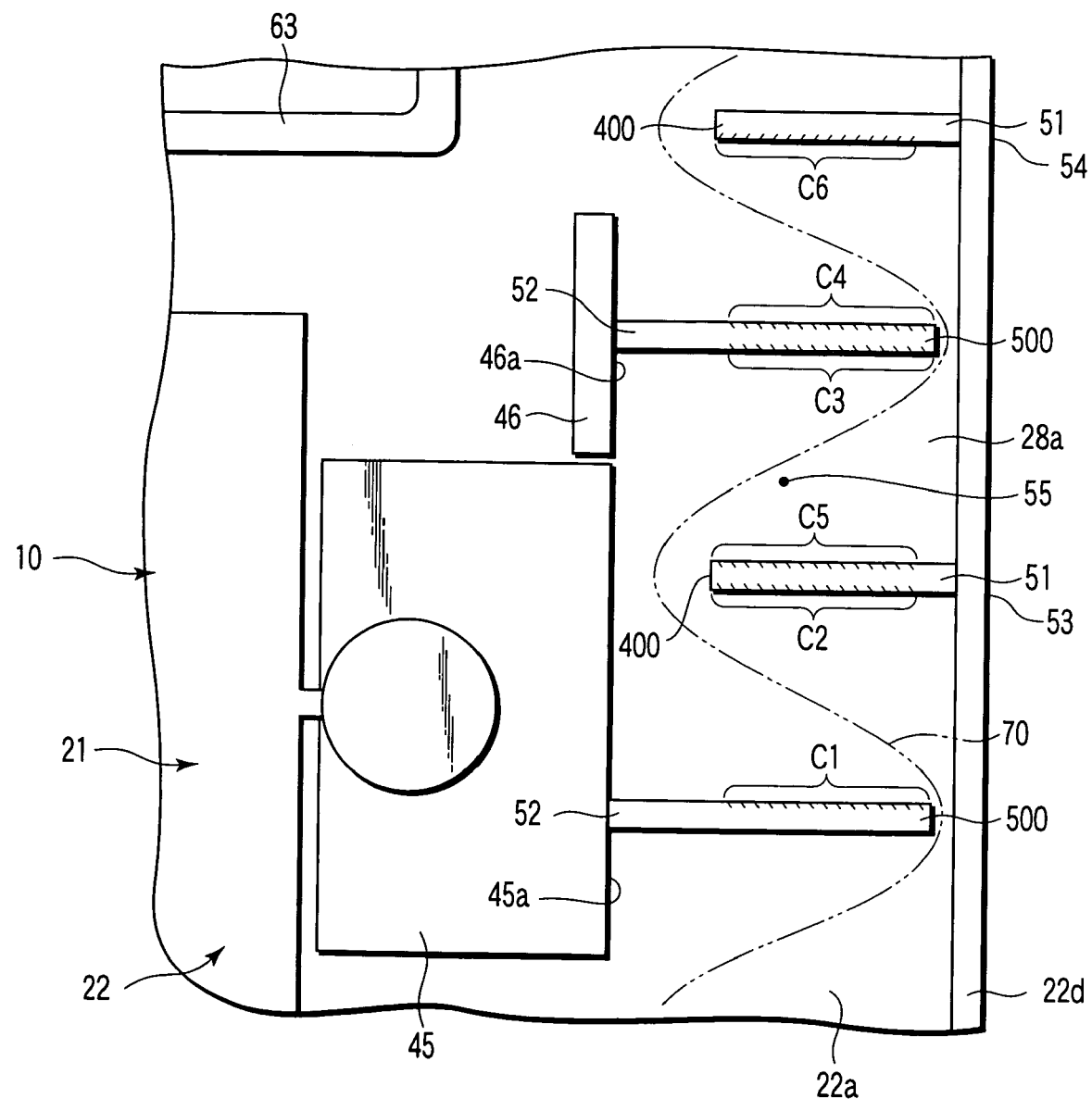
FIG. 8 is a plan view showing an arrangement relation between first and second ribs of a portable computer in a second embodiment of the present invention.

FIG. 8 shows a protruding portion 28a of the present embodiment. In the present embodiment, there will be described first ribs 51 formed in first and second points 53 and 54, and second ribs 52 formed on a protrusion 45 and a vertical wall 46 with reference to FIG. 8.

In the present embodiment, the second ribs 52 formed on the protrusion 45 and the vertical wall 46 extend immediately before an upper right wall 22d.

Moreover, since the second rib 52 extends immediately before the upper right wall 22d, a deflection width of a crack 70 formed by an impact increases. That is, a length of the crack 70 in a certain region increases. Therefore, a region where the crack 70 is formed is effectively minimized.

Note that in the present embodiment, there have been described representatively the first and second ribs 51, 52 formed on the upper right wall 22d, the protrusion 45, and the vertical wall 46 within the region of the protruding portion 28a. However the present invention is not limited to this embodiment. For example, the ribs described above may be disposed in another portion of the upper cover 22, a lower cover 23, or a second housing 31. The second rib 52 may extend immediately before a side wall represented by the upper right wall 22d as in the present embodiment.

Since the crack 70 largely winds its way in the region provided with the second rib 52 described in the present embodiment, the region provided with the crack is effectively reduced in addition to the effect of the first embodiment.

Next, there will be described an electronic device in a third embodiment of the present invention in accordance with a portable computer 10 as one example with reference to FIG. 9. Noted that a constitution having a function similar to that of the first embodiment is denoted with the same reference numerals and description is omitted.

The present embodiment is different from the first embodiment in a length of a second rib 52. This respect will be described specifically.

In the present embodiment, there will be described representatively the first ribs 51 formed in first and second points 53 and 54 and second ribs 52 formed on a protrusion 45 and a vertical wall 46.

Figure 9:
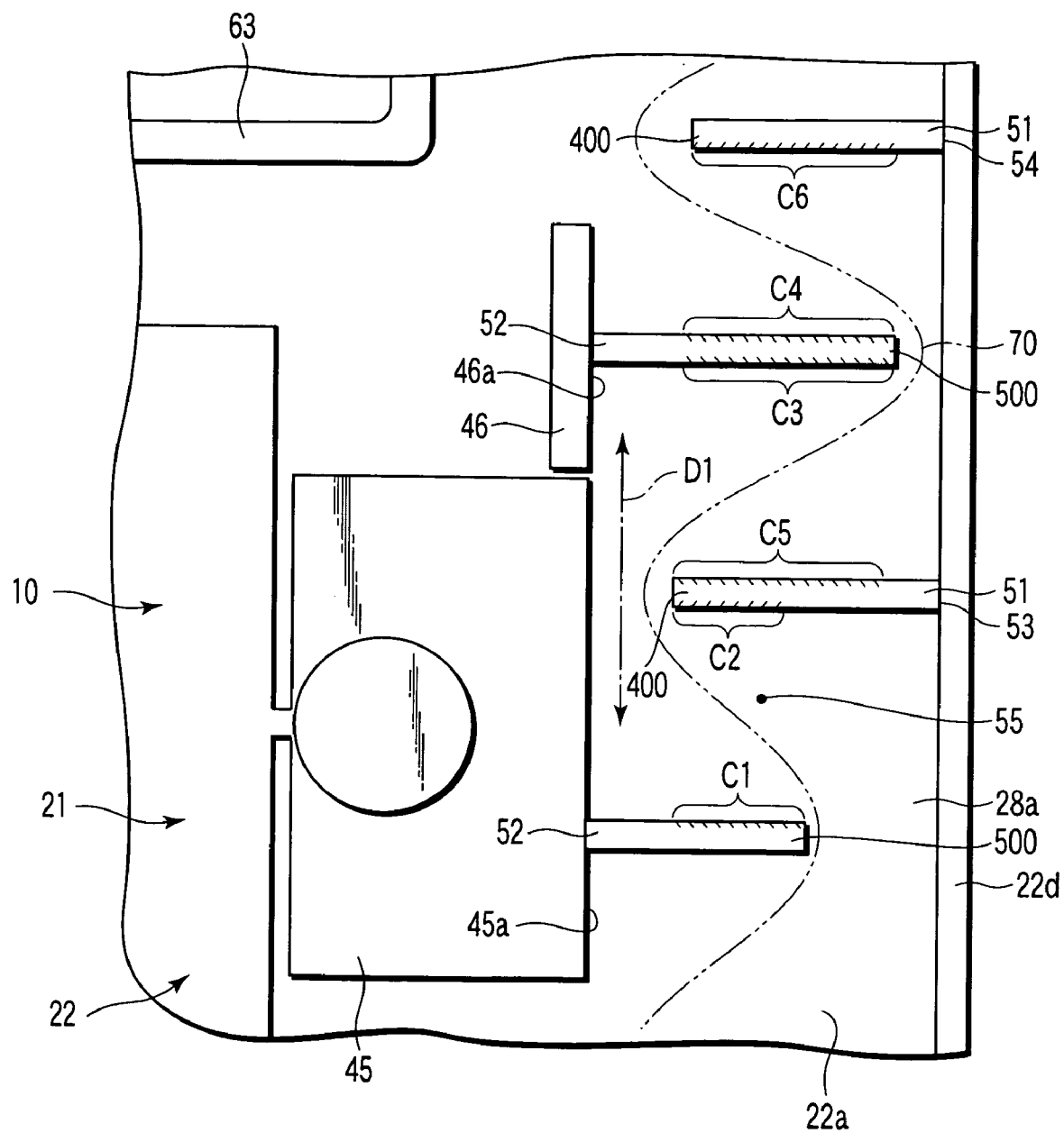
FIG. 9 is a plan view showing an arrangement relation between the first and second ribs of a portable computer in a third embodiment of the present invention.

FIG. 9 shows a protruding portion 28a of the present embodiment. In the present embodiment, as shown in FIG. 9, for example, the second rib 52 formed on the vertical wall 46 is longer than the second rib 52 formed on the protrusion 45. In the present embodiment, an effect similar to that of the first embodiment can be obtained.

Note that in the present embodiment, there have been described representatively the first ribs 51 formed in the first and second points 53 and 54 and the second ribs 52 formed on the protrusion 45 and the vertical wall 46. However the present invention is not limited to this embodiment.

For example, a reinforcing structure using the second ribs 52 having different lengths may be disposed in another portion of the upper cover 22, a first housing 21, a lower cover 23, or a second housing 31 as in the present embodiment. Even in this case, a similar effect is obtained.

Next, there will be described an electronic device in a fourth embodiment of the present invention in accordance with a portable computer 10 as one example with reference to FIG. 10. Note that a constitution having a function similar to that of the first embodiment is denoted with the same reference numerals and description is omitted.

The present embodiment is different from the first embodiment in that a plurality of second ribs 52 are disposed between the first ribs 51 disposed adjacent to each other in an arrangement direction. This respect will be described specifically.

Figure 10:
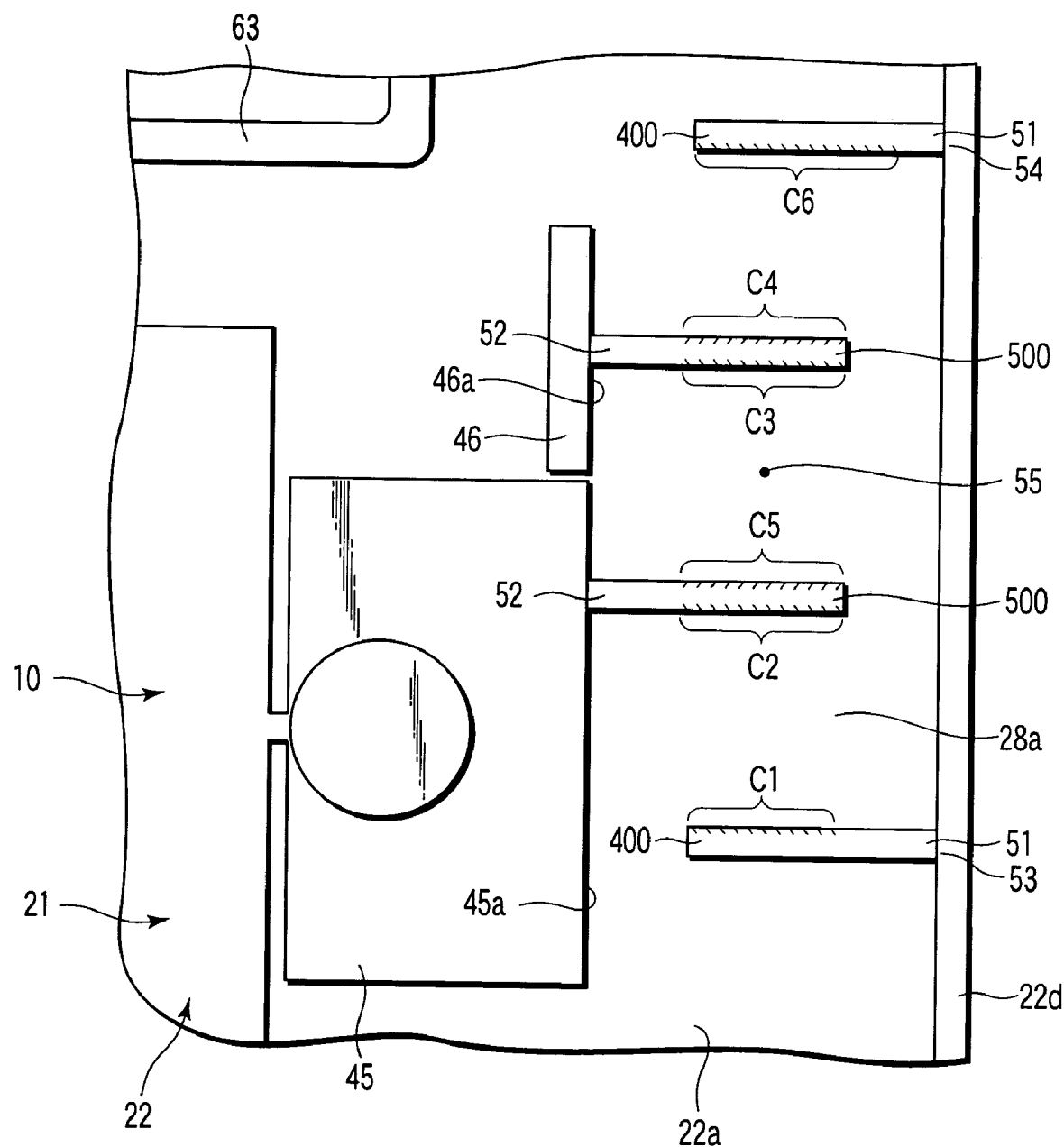
FIG. 10 is a plan view showing an arrangement relation between the first and second ribs of a portable computer in a fourth embodiment of the present invention.

FIG. 10 shows a protruding portion 28a of the present embodiment. In the present embodiment, there will be described representatively the first ribs 51 formed in first and second points 53 and 54 and second ribs 52 formed on a protrusion 45 and a vertical wall 46.

In the present embodiment, the second rib 52 formed on the protrusion 45 is disposed between the first ribs 51 formed in the first and second points 53 and 54. Even in the present embodiment, an effect similar to that of the first embodiment can be obtained.

Note that in the present embodiment, two second ribs 52 are formed between the first ribs 51 formed in the first and second points 53 and 54. However the present invention is not limited to this embodiment. For example, three or four second ribs 52 may be formed between the first ribs 51 formed in the first and second points 53 and 54.

Moreover, the reinforcing structure in which a plurality of second ribs 52 are formed between the first ribs 51 disposed adjacent to each other in an arrangement direction as described above is not limited to that formed in the protruding portion 28a. The reinforcing structure in which a plurality of second ribs 52 are formed between the first ribs 51 disposed adjacent to each other may be formed in, for example, another portion of the upper cover 22, a lower cover 23, a second housing 31 or the like.

In the present embodiment, there has been disclosed the reinforcing structure in which a plurality of second ribs 52 are formed between the first ribs 51 disposed adjacent to each other. However, needless to say, a plurality of first rib 51 may be formed between the adjacent second ribs 52.

Next, there will be described an electronic device in a fifth embodiment of the present invention in accordance with a portable computer 10 as one example with reference to FIG. 11. Note that a constitution having a function similar to that of the fourth embodiment is denoted with the same reference numerals and description is omitted.

The present embodiment is different from the fourth embodiment in arrangement of second ribs 52 formed on a protrusion 45 and a vertical wall 46. This respect will be described specifically.

Figure 11:
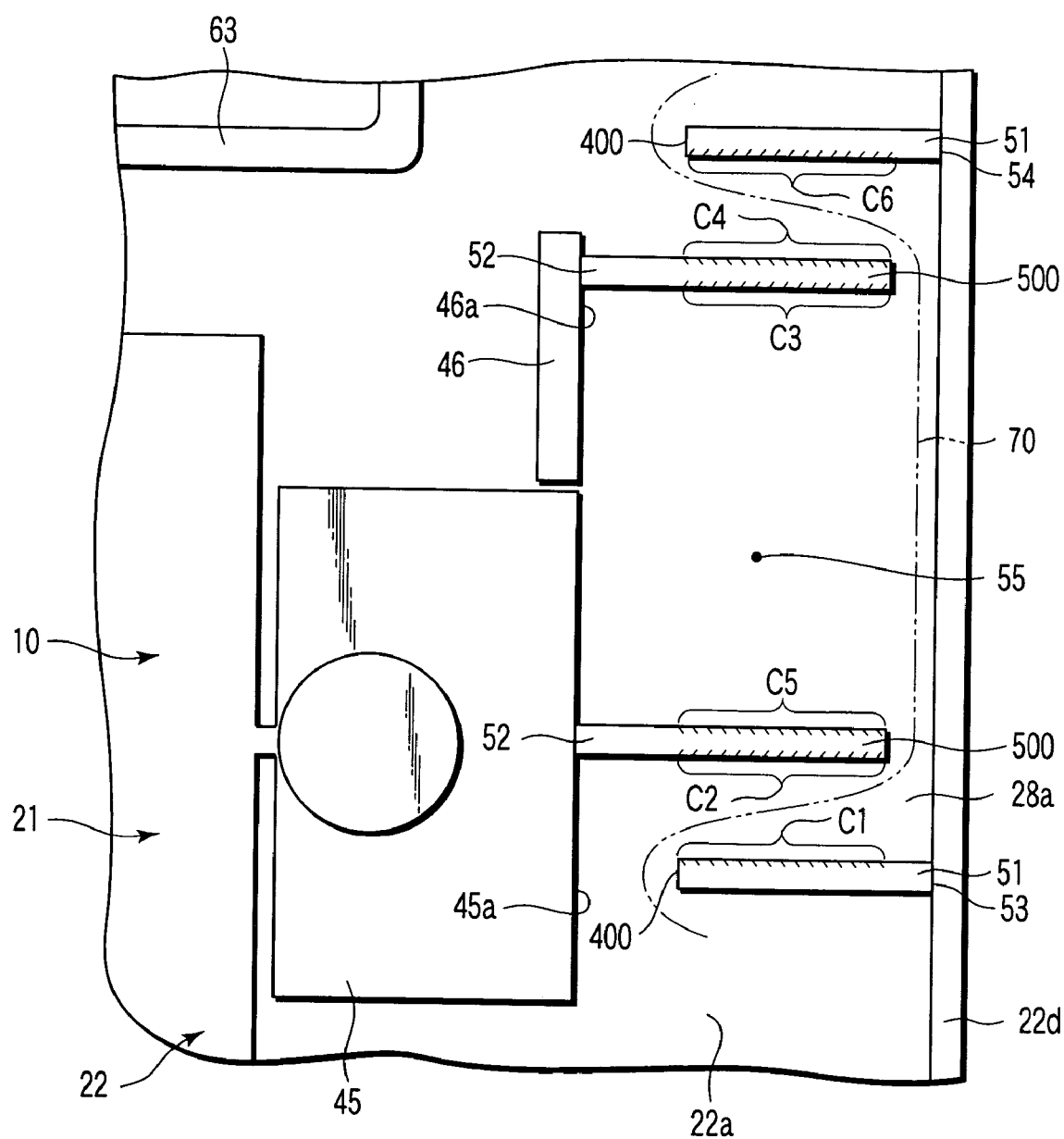
FIG. 11 is a plan view showing an arrangement relation between the first and second ribs of a portable computer in a fifth embodiment of the present invention.

FIG. 11 shows an arrangement relation between first ribs 51 and the second ribs 52 in the protruding portion 28a. As shown in FIG. 11, in the present embodiment, the second rib 52 formed on the protrusion 45 is disposed immediately beside the first rib 51 formed in a first point 53. The second rib 52 formed on the vertical wall 46 is disposed immediately beside the first rib 51 formed in a second point 54.

When each second rib 52 facing the first rib 51 in an arrangement direction is disposed beside the facing first rib 51 as in the present embodiment, a region of a crack 70 passing between the first and second ribs 51, 52 is substantially parallel to the first and second ribs 51, 52. Therefore, the crack 70 lengthens in a region in the vicinity of the first and second ribs 51, 52 facing each other in the arrangement direction. Therefore, in addition to an effect of the fourth embodiment, the region where the crack 70 is formed is minimized.

Next, there will be described an electronic device in a sixth embodiment of the present invention in accordance with a portable computer 10 as one example with reference to FIG. 12. Note that a constitution having a function similar to that of the fourth embodiment is denoted with the same reference numerals and description is omitted.

The present embodiment is different from the fourth embodiment in lengths and arrangements of a plurality of second ribs 52 disposed between first ribs 51 disposed adjacent to each other along a direction in which the plurality of first and second ribs 51, 52 are arranged. This respect will be described specifically.

In the present embodiment, the second ribs 52 disposed between first and second points 53 and 54 are formed and arranged to bring a position of a crack 70 formed by an impact to an arbitrary position.

Figure 12:
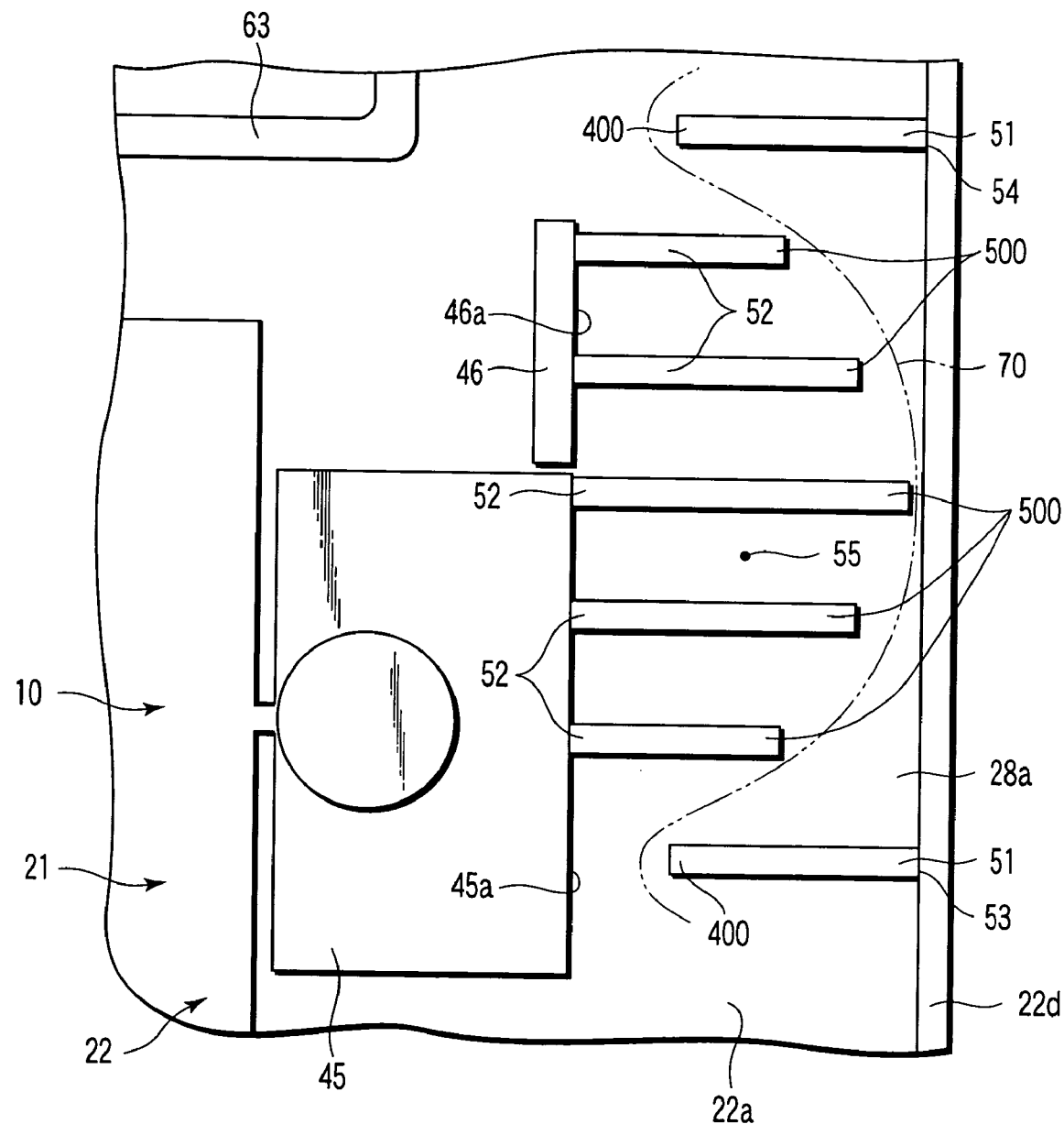
FIG. 12 is a plan view showing an arrangement relation between the first and second ribs of a portable computer in a sixth embodiment of the present invention.

Specifically, as shown in FIG. 12, for example, five second ribs 52 are formed between the first and second points 53 and 54. Among these five second ribs 52, three second ribs 52 are formed on a protrusion 45. Two remaining second ribs 52 are formed on a vertical wall 46.

Among three second ribs 52 formed on the protrusion 45, the second rib 52 disposed rearward extend to a position immediately before an upper right wall 22*d*. The lengths of the second ribs 52 disposed on opposite sides of the second rib 52 gradually shorten toward the first ribs 51 formed in the first and second points 53 and 54.

A shape formed by connecting tips of the second ribs 52 formed in this manner is a mountain shape protruding toward an upper right wall 22*d*.

Therefore, a shape of the crack 70 formed by the impact is a mountain shape protruding toward the upper right wall 22*d* as shown by a two-dot chain line in the drawing.

In the present embodiment, a plurality of second ribs 52 bring the crack 70 into a large mountain shape. However the present invention is not limited to this embodiment.

Since the lengths or the arrangement of the second ribs 52 are set arbitrarily, in addition to an effect of the fourth embodiment, the shape of the crack 70 formed by the impact can be set to be arbitrary.

Next, there will be described an electronic device in a seventh embodiment of the present invention in accordance with a portable computer 10 as one example with reference to FIGS. 13 and 14. Note that a constitution having a function similar to that of the first embodiment is denoted with the same reference numerals and description is omitted.

The present embodiment is different from the first embodiment in regions in which first and second ribs 51, 52 are formed. This respect will be described specifically.

Figure 13:
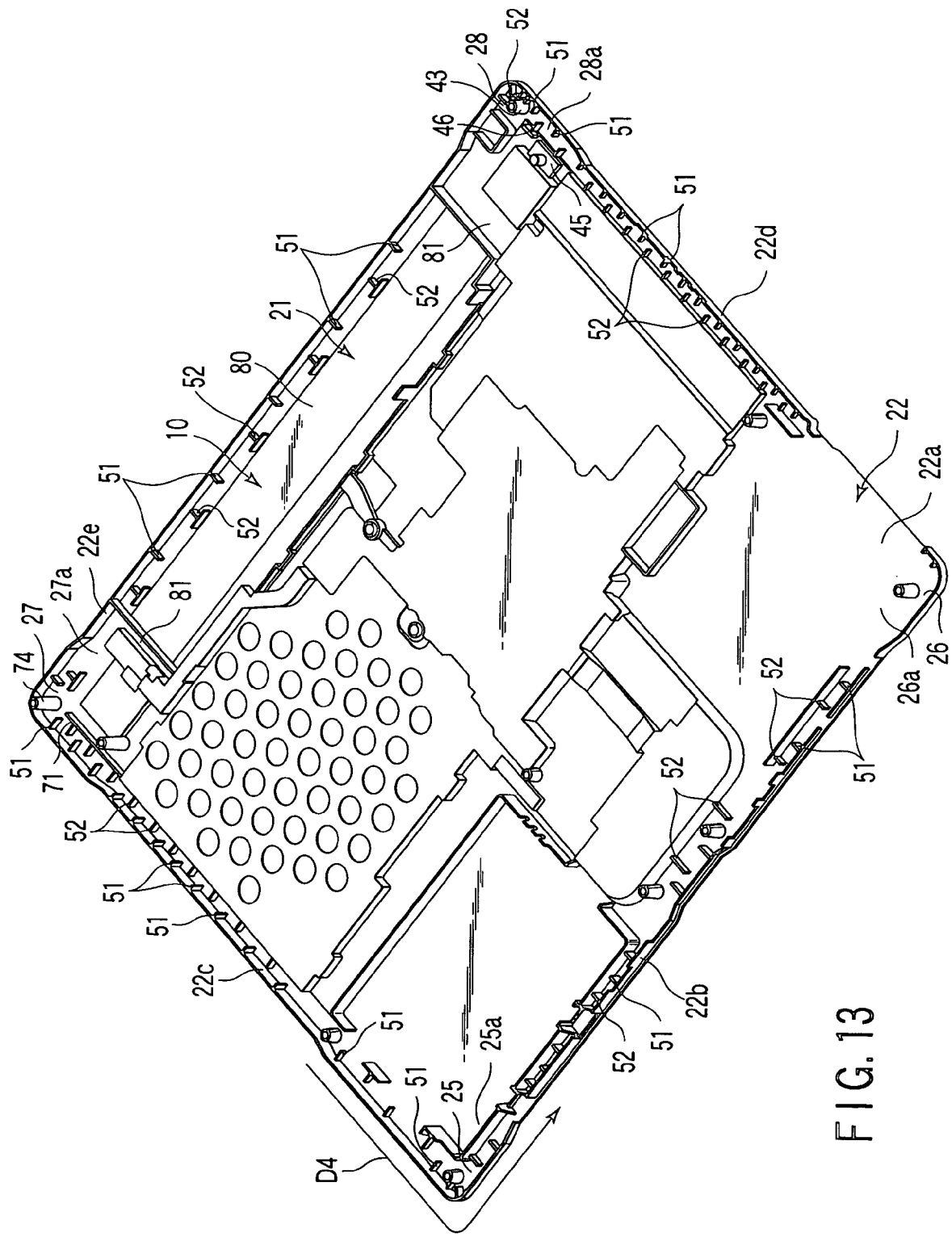
FIG. 13 is a perspective view showing the inside of an upper cover of a portable computer in a seventh embodiment of the present invention.

As shown in FIG. 13, in the present embodiment, the first and second ribs 51, 52 are formed over the substantially whole region of a side wall of an upper cover 22, that is, an upper front wall 22*b*, an upper left wall 22*c*, an upper right wall 22*d*, and an upper rear wall 22*e*.

Note that a cover member 80 is separately attached to the inside of a rear end of the upper cover 22 in a width direction. Therefore, even if the portable computer falls, an impact is not easily input into the inside of the rear end of the portable computer 10.

Therefore, in the present embodiment, any of the first and second ribs 51, 52 is not formed in inner portions 81 along the upper rear wall 22*e* in protruding portions 27*a*, 28*a*. However, the present invention is not limited to this embodiment. For example, the first and second ribs 51, 52 may be formed in the inner portions 81 along the upper rear wall 22*e* in the protruding portions 27*a*, 28*a*.

Moreover, shown in FIG. 14, in a case where the upper rear wall 22*e* extends in the width direction as shown by a two-dot chain line in the drawing without using the cover member 80, the first and second ribs 51, 52 may be formed along the upper rear wall 22*e* as shown by a two-dot chain line.

As shown in FIGS. 13 and 14, in the present embodiment, the first and second ribs 51, 52 are alternately arranged along a peripheral wall. However, the present invention is not limited to this embodiment. For example, partially as described in the fourth to sixth embodiments, a plurality of second ribs 52 may be formed between the adjacent first ribs 51 along the peripheral wall. Note that a direction D4 along the peripheral wall, that is, the upper front wall 22*b*, the upper left wall 22*c*, the upper right wall 22*d*, and the upper rear wall 22*e* is a direction in which the first and second ribs 51, 52 are arranged as mentioned in the present invention.

In the present embodiment, the strength of the upper cover 22 is enhanced.

Note that the first and second ribs 51, 52 may be formed in the substantially whole area of the side wall of a lower cover 23, that is, a lower front wall 23*b*, a lower left wall 23*c*, a lower right wall 23*d*, and a lower rear wall 23*e*. In this case, the strength of the lower cover 23 is enhanced. The first and second ribs 51, 52 may be formed over the substantially whole area of a side wall of a second housing 31. In this case, the strength of the second housing 31 is enhanced.

Moreover, in the present invention, the first to seventh embodiments have been described by use of the portable computer 10. However, the present invention is not limited to this example. The present invention may be used in, for example, a case of a battery pack as one example of the electronic device.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
a housing; and
a circuit board contained in the housing;
the housing comprising:
a main wall;
a side wall integrally formed with the main wall;
a vertical wall integrally formed with the main wall in a corner area including a corner portion of the housing and an adjoining portion that adjoins the corner portion, and facing to the side wall;
a first rib integrally formed with the side wall and the main wall and extending from the side wall toward the vertical wall, the first rib having a first end portion separated from the vertical wall, and being located in the corner area; and
a second rib integrally formed with the vertical wall and the main wall and extending from the vertical wall toward the side wall, the second rib having a second end portion separated from the side wall and facing to the first end portion, the second rib being located in the corner area.

2. The electronic device of claim 1, wherein a plurality of first and second ribs are formed in the housing.

3. The electronic device of claim 2, wherein at least a part of the plurality of first and second ribs are arranged alternately one by one in an arrangement direction in which the first ribs and the second ribs are arranged.

4. The electronic device of claim 3, wherein at least a pair of second ribs disposed adjacent to each other via the first rib in the arrangement direction have mutually different lengths.

5. The electronic device of claim 2, wherein the plurality of second ribs are arranged in a region between the first ribs disposed adjacent to each other in an arrangement direction in which the first ribs and the second ribs are arranged.

6. The electronic device of claim 5, wherein the second rib disposed adjacent to the first rib along the arrangement direction is disposed on the side of the first rib.

7. The electronic device of claim 5, wherein lengths of the plurality of second ribs arranged in a region between the first ribs disposed adjacent to each other along the arrangement direction depend on a position of a crack to be formed in the main wall.

8. The electronic device of claim 1, wherein heights of the first and second ribs are larger than a thickness of the main wall in a point where these first and second ribs are formed.

9. The electronic device of claim 1, wherein the corner portion and the adjoining portion form a protruding portion protruding outwardly from other portions of the housing.

10. The electronic device of claim 1, wherein the arrangement direction is linear, and
a length of the facing area is larger than a half of a distance between the first rib and the second rib disposed adjacent to each other along an arrangement direction in which the first ribs and the second ribs are arranged.

11. An electronic device comprising:
a circuit board; and
a housing to contain the circuit board, the housing comprises:
a main wall,
a side wall integrally formed with the main wall,
a vertical wall integrally formed with the main wall at a corner portion of the housing, the vertical wall facing to the side wall,
a plurality of first ribs including a first rib integrally formed with the side wall and the main wall and extending from the side wall toward the vertical wall, the first rib being located in the corner portion of the housing and having a first end portion separated from the vertical wall, and
a plurality of second ribs including a second rib integrally formed with the main wall and extending toward the side wall, the second rib being located in the corner portion of the housing and having a second end portion separated from the side wall and facing to the first end portion.

12. The electronic device of claim 11, wherein the plurality of first ribs and the plurality of second ribs are arranged alternatively.

13. The electronic device of claim 12, wherein at least a pair of plurality of second ribs that neighbor each other and have mutually different lengths are separated by the first rib.

14. The electronic device of claim 11, wherein the plurality of second ribs are arranged in a region between the plurality of first ribs.

15. The electronic device of claim 14, wherein the second rib disposed adjacent to and on a side of the first rib.

16. The electronic device of claim 11, wherein heights of the first rib and the second rib are larger the a thickness of the main wall at the corner portion.

17. The electronic device of claim 11, wherein the corner portion of the housing is part of a protruding portion of the housing, the protruding portion being a corner area of the housing that extends outwardly from a remainder of the housing.

* * * * *